(12) United States Patent
Ortiz (10) Patent No.: US 7,793,109 B2
(45) Date of Patent: *Sep. 7, 2010

(54) RANDOM BIOMETRIC AUTHENTICATION APPARATUS

(75) Inventor: Luis Melisendro Ortiz, Dallas, TX (US)

(73) Assignee: Mesa Digital, LLC, Albuquerque, NM (US)

( * ) Notice: Subject to any disclaimer, the term of this patent is extended or adjusted under 35 U.S.C. 154(b) by 1633 days.

This patent is subject to a terminal disclaimer.

(21) Appl. No.: 10/322,018

(22) Filed: Dec. 17, 2002

(65) Prior Publication Data

US 2003/0120934 A1    Jun. 26, 2003

Related U.S. Application Data

(63) Continuation of application No. 09/757,903, filed on Jan. 10, 2001.

(51) Int. Cl.
| | |
|---|---|
| *G06F 21/00* | (2006.01) |
| *G06F 7/04* | (2006.01) |
| *G06F 17/30* | (2006.01) |
| *H04L 29/06* | (2006.01) |
| *G06K 9/62* | (2006.01) |

(52) U.S. Cl. .......................... 713/186; 726/5; 382/155
(58) Field of Classification Search ................. 713/186; 382/155; 726/5
See application file for complete search history.

(56) References Cited

U.S. PATENT DOCUMENTS

| | | | |
|---|---|---|---|
| 5,021,776 A | 6/1991 | Anderson et al. | 340/825.31 |
| 5,229,764 A | 7/1993 | Matchett et al. | 340/825.34 |

(Continued)

FOREIGN PATENT DOCUMENTS

| | | | |
|---|---|---|---|
| EP | 0 613 576 B1 | 6/1996 |

(Continued)

OTHER PUBLICATIONS

Malmsten, V., "Eye Scans—Authentication with Biometrics," Sans Institute, Information Security Reading Room, Nov. 21, 2000.

(Continued)

*Primary Examiner*—William R Korzuch
*Assistant Examiner*—Trang Doan
(74) *Attorney, Agent, or Firm*—Kermit D. Lopez; Luis M. Ortiz; Ortiz & Lopez, PLLC (57) ABSTRACT

A biometric apparatus for biometrically securing access to an electronic system is disclosed. Such an apparatus can be configured to include a hardware unit having an input area integrated therein for inputting at least one biometric attribute. The hardware unit can communicate with an electronic system, such as, for example, a building, a computer, a computer network, wireless network, ATM machine, electronic database, etc. A display area can be integrated with the hardware unit, wherein the display area displays data which prompts a user to input to the input area one or more biometric attributes randomly selected from a user profile containing biometric attributes of the user. A biometric module can also be associated with the hardware unit, wherein the biometric module permits the user to perform a user-desired activity, if one or more biometric attributes input by the user via the input area matches at least one biometric attribute randomly selected from the user profile.

21 Claims, 8 Drawing Sheets

U.S. PATENT DOCUMENTS

| | | | |
|---|---|---|---|
| 5,291,560 A | 3/1994 | Daugman | 382/2 |
| 5,469,506 A | 11/1995 | Berson et al. | 380/23 |
| 5,586,186 A | 12/1996 | Yuval et al. | 380/30 |
| 5,617,082 A | 4/1997 | Denison et al. | 340/825.31 |
| 5,712,912 A | 1/1998 | Tomko et al. | 380/23 |
| 5,751,836 A | 5/1998 | Wildes et al. | 382/117 |
| 5,787,187 A | 7/1998 | Bouchard et al. | 382/115 |
| 5,802,199 A | 9/1998 | Pare, Jr. et al. | 382/115 |
| 5,815,252 A * | 9/1998 | Price-Francis | 356/71 |
| 5,842,194 A | 11/1998 | Arbuckle | 706/52 |
| 5,886,644 A | 3/1999 | Keskin et al. | 340/825.31 |
| 5,894,277 A | 4/1999 | Keskin et al. | 340/825.31 |
| 5,901,238 A | 5/1999 | Matsushita | 382/117 |
| 5,915,035 A | 6/1999 | Hsiao et al. | 382/125 |
| 5,956,122 A | 9/1999 | Doster | 351/210 |
| 5,973,624 A | 10/1999 | Miller et al. | 341/35 |
| 5,978,495 A * | 11/1999 | Thomopoulos et al. | 382/124 |
| 5,991,408 A | 11/1999 | Pearson et al. | 380/23 |
| 5,995,642 A | 11/1999 | Hsu et al. | 382/124 |
| 6,011,858 A | 1/2000 | Stock et al. | 382/115 |
| 6,012,064 A | 1/2000 | Gibbons et al. | 707/103 |
| 6,016,476 A | 1/2000 | Maes et al. | 705/1 |
| 6,018,739 A | 1/2000 | McCoy et al. | 707/102 |
| 6,038,315 A | 3/2000 | Strait et al. | 380/23 |
| 6,038,332 A | 3/2000 | Fishbine et al. | 382/115 |
| 6,038,334 A | 3/2000 | Hamid | 382/124 |
| 6,038,666 A | 3/2000 | Hsu et al. | 713/186 |
| 6,047,281 A | 4/2000 | Wilson et al. | 707/3 |
| 6,047,282 A | 4/2000 | Wilson et al. | 707/3 |
| D426,237 S | 6/2000 | Wranne | D14/385 |
| 6,072,891 A | 6/2000 | Hamid et al. | 382/116 |
| 6,092,192 A | 7/2000 | Kanevsky et al. | 713/186 |
| 6,105,010 A | 8/2000 | Musgrave | 705/44 |
| 6,108,636 A | 8/2000 | Yap et al. | 705/5 |
| 6,111,977 A | 8/2000 | Scott et al. | 382/124 |
| 6,119,096 A | 9/2000 | Mann et al. | 705/5 |
| 6,140,939 A | 10/2000 | Flick | 340/825.69 |
| 6,154,879 A * | 11/2000 | Pare et al. | 705/35 |
| 6,160,903 A | 12/2000 | Hamid et al. | 382/115 |
| 6,167,517 A * | 12/2000 | Gilchrist et al. | 713/186 |
| 6,213,391 B1 * | 4/2001 | Lewis | 235/380 |
| 6,256,737 B1 * | 7/2001 | Bianco et al. | 713/186 |
| 6,360,953 B1 * | 3/2002 | Lin et al. | 235/492 |
| 6,393,305 B1 * | 5/2002 | Ulvinen et al. | 455/563 |
| 6,496,595 B1 * | 12/2002 | Puchek et al. | 382/124 |
| 6,819,219 B1 * | 11/2004 | Bolle et al. | 340/5.52 |
| 6,845,453 B2 * | 1/2005 | Scheidt et al. | 726/5 |
| 6,931,538 B1 * | 8/2005 | Sawaguchi | 713/186 |
| 6,944,773 B1 * | 9/2005 | Abrahams | 709/229 |
| 2002/0162026 A1 * | 10/2002 | Neuman et al. | 713/201 |

FOREIGN PATENT DOCUMENTS

| | | |
|---|---|---|
| EP | 0 752 143 B1 | 12/1997 |
| EP | 0 630 504 B1 | 5/2000 |
| WO | WO 0054214 | 9/2000 |

OTHER PUBLICATIONS

Zdenek, et al., "Biometric Authentication Systems," FI MU Report Series, FIMU-RS-2000-08, Nov. 2000.
Furusawa, M., "Advanced Encryption Standard (AES) Perspective and Strategies," Consumer Direct Link, Inc., Oct. 22, 2000, pp. 1-5.
McDowall, R.D., "Biometrics: The Password You'll Never Forget," LC GC Europe, Oct. 2000.
Bohm, et al., "Electronic Commerce: Who Carried The Risk of Fraud?" 2000 (3) The Journal of Information, Law and Technology (JILD), Oct. 31, 2000 http://elj.warwick.ac.uk/jilt/00-3/bohm.html.
"Who Goes There? Biometric Technologies Make You Your Best ID," How Computers Work, Part II, vol. 4, Issue 3, Aug. 2000, pp. 107-113.
Bracco, T., "Biometrics suites earn a thumbs up," Network World, vol. 17, No. 19, May 8, 2000.
Recktenwald, J., "Electronic authentication technology takes off," TechRepublic, Apr. 26, 2000.
Cambier J., "Biometric Identification in Large Populations," Information Security Bulletin, Mar. 2000, pp. 17-26.
Pankanti et al., "Biometrics: The Future of Identification," Computer, IEEE, Feb. 2000, pp. 46-49.
Phillips et al., "An Introduction to Evaluating Biometric Systems," Computer, IEEE, Feb. 2000, pp. 56-63.
Reynolds et al., "Automatic Speaker Recognition," Humans, Computers and Speech Symposium, AAAS 2000 Meeting, Feb. 19, 2000.
Negin et al., "An Iris Biometric System for Public and Personal Use," Computer, IEEE, Feb. 2000, pp. 2-7.
Biometrics Working Group, "Best Practices in Testing and Reporting of Biometric Devices," Version 1.0, Jan. 12, 2000.
Bowman, E., "Everything You Need to Know About Biometrics," Identix Corporation, Jan. 2000.
Daugman, J., "Biometric Decision Landscapes," University of Cambridge, The Computer Laboratory, UCAM-CL-TR-482, Jan. 2000.
Prevost, J., "Biometrics With Limited Government Intervention: How to Provide for Privacy and Security Requirements of Networked Digital Environments," MIT 6.805/STS085: Ethics and Law on the Electronic Frontier, Fall 1999.
Schneier, B., "Security in the Real World: How to Evaluate Security Technology," Computer Security Journal, vol. XV, No. 4, 1999, pp. 1-14.
Haahr, M., "Introduction to Randomness and Random Numbers," Random.org, Jun. 1999, http://www.random.org/essay/html.
Lee et al., "A 600-dpi Capacitive Fingerprint Sensor Chip and Image-Synthesis Technique," IEEE Journal of Solid-State Circuits, vol. 34, No. 4, Apr. 1999, pp. 469-475.
Jun et al., "The Intel Random Number Generator," Cryptography Research, Inc., White Paper Prepared for Intel Corporation, Apr. 22, 1000.
Soutar, C., "Biometric system performance and security," Mytec Technologies, Inc., IEEE Workshop on Automatic Identification Advanced Technologies (AutoID '99), Sep. 1999, pp. 1-7.
Roddy et al., "Fingerprint Features—Statistical Analysis and System Performance Estimates," Feb. 10, 1999, pp. 1-64.
Boneh, D., "Twenty Years of Attacks on the RSA Cryptosystem," Notices of the AMS, Feb. 1999, pp. 203-213.
Grosse, P., "SignCrypt: Biometric Verification," Quintet, Inc., Feb. 1999, pp. 1-5.
Ankari, "BioMouse Plus, Biometric and Smart Card User Authentication," Discussion Paper, Jan. 1999.
"Biometric Encryption," Ch. 22, ICSA Guide to Cryptography, Edited by R. Nichols, McGraw-Hill (1999).
Ashbourn, J., "The Biometric White Paper," pp. 1-14, http://homepage.ntlworld.com/avanti/whitepaper.htm.
Woodward Jr., J., "DSS's Biometric ID Project," Testimony of John D. Woodward, Jr., For the Hearing of the Subcommittee on Domestic and International Monetary Policy, Committee on Banking and Financial Services, U.S. House of Representatives One Hundred Fifth Congress on "Biometrics and the Future of Money," May 20, 1998, pp. 1-11.
Schneier B., "Security Pitfalls in Cryptography," Counterpane Systems, 1998, pp. 1-11.
Van Natta et al., "Biometric Solutions to Personal Identification: A White Paper Describing Technologies Available for Establishing and Maintaining Your Identity in Cyberspace," Digital Persona, Providers of U.are.U, Fingerprint Recognition System, Jan. 1998, pp. 1-22.
Carver, C., "Information Warfare: Task Force XXI or Task Force Smith," Military Review, Sep.-Nov. 1998, pp. 26-30.
Avolio, F., "Identity Confirmed: Token, smart card and biometric authentication schemes are making their way from the movies to the mainstream," Network World, Aug. 24, 1998.
Page, D., "Biometrics: Facing Down the Identity Crisis," High Technology Careers Magazine, Feature Presentation, 1998, http://www.hightechcareers.com/doc198/biometrics198.html.
Jueneman et al., "Biometrics and Digital Signatures in Electronic Commerce," 38 Jurimetrics, Spring 1998, pp. 1-31.

Jain et al., "On-Line Fingerprint Verification," Nov. 26, 1996, pp. 1-36.

Tomko, G., "Biometric Encryption: New Developments in Biometrics," 18th International Privacy and Data Protection Conference, Sep. 19, 1996.

Menezes et al., "Chapter 5: Pseudorandom Bits and Sequences," Handbook of Applied Cryptography, CRC Press, 1996, pp. 169-190.

* cited by examiner

RANDOM BIOMETRIC AUTHENTICATION APPARATUS

CROSS REFERENCE TO RELATED PATENT APPLICATION

This is a continuation of U.S. patent application Ser. No. 09/757,903, which was filed on Jan. 10, 2001, and which is incorporated herein by reference in its entirety.

TECHNICAL FIELD OF THE INVENTION

The present invention relates to authentication for and security of electronic systems, such as computers, kiosks, wireless devices, associated fixed and wireless networks, and mechanical systems, such as secure buildings. The present invention also relates to the use of biometric data for authenticating user identity and providing secure user access to data and/or transactions.

BACKGROUND OF THE INVENTION

Security for electronic and mechanical systems has rapidly become an important issue in recent years. With the proliferation of computers, computer networks and other electronic device and networks into all aspects of business and daily life, the concern over secure file and transaction access has grown tremendously. The ability to secure data and transactions is particularly important for financial, medical, education, government, military, and communications endeavors.

Using passwords is a common method of providing security for electrical or mechanical systems. Password protection and/or combination type locks are employed for computer network security, automatic teller machines, telephone banking, calling cards, telephone answering services, buildings, factories, houses and safes. These systems generally require the knowledge of an entry code that has been selected by or provided to a user or has been configured in advance.

Pre-set codes are often forgotten, however, as users have no reliable method of remembering them. Writing down codes and storing them in close proximity to an access control device (e.g., a combination lock) results in an insecure access control system. Alternatively, the nuisance of trying several code variations generally renders the access control system more of a problem than a solution.

Password systems are known to suffer from other disadvantages. Usually, a user specifies passwords. Most users, being unsophisticated users of security systems, choose passwords that are relatively insecure. As such, many password systems are easily accessed through a simple trial and error process.

To secure access to particular areas, such as buildings, the most common building security system relied on traditionally has been a security guard. A security guard reviews identification cards and compares pictures thereon to a person carrying the card. The security guard provides access upon recognition or upon other criteria. Other building security systems use card access, password access, or another secure access approach. Unfortunately, passwords and cards have similar drawbacks when utilized for building security, particularly with computer security.

As computer networks are increasingly used to link remote computer systems together, applications have been developed to allow a user on a remote client computer system to access a service on a host computer system. For example, a user on a client system may be able to access information contained in a database associated with a host computer system. Unfortunately, along with increased accessibility comes increased potential for security breaches. For example, communications, including authentication, between a client system and a host system can be intercepted and tampered with while in transit over the computer network. This may allow third parties or malicious users on a client computer system to gain access to, or security codes for, a service on a host computer system without proper authorization.

A number of systems have been developed to ensure that users do not gain unauthorized access to host computer systems. As explained above, some systems prompt a user for passwords. Such systems may also rely on PIN numbers, before granting the user access to the host computer system. As indicated above, however, passwords and PIN numbers may be forgotten or may fall into the wrong hands. Additionally, using passwords and PIN numbers for security purposes places an additional burden on institutions because passwords or PIN numbers require additional machinery and human resources to deal with customers when customers forget passwords or PIN numbers, or when customers request that passwords or PIN numbers be changed.

As an alternative to traditional security approaches, such as security guards, passwords or PIN numbers, biometric authentication systems have been developed to authorize accesses to various electronic and mechanical systems. Biometrics can generally be defined as the science of utilizing unique physical or behavioral personal characteristics to verify the identity of an individual. Biometric authentication systems are typically combined with hardware and software systems for automated biometric verification or identification. Biometric authentication systems receive a biometric input, such as a fingerprint or a voice sample, from a user. This biometric input is typically compared against a prerecorded template containing biometric data associated with the user to determine whether to grant the user access to a service on the host system.

A biometric security access system can thus provide substantially secure access and does not require a password or access code. A biometric identification system accepts unique biometric information from a user and identifies the user by matching the information against information belonging to registered users of the system. One such biometric system is a fingerprint recognition system.

In a fingerprint biometric system input transducer or sensor, the finger under investigation is usually pressed against a flat surface, such as a side of a glass plate; the ridge and valley pattern of the finger tip is sensed by a sensing means such as an interrogating light beam. In order to capture an image of a fingerprint, a system may be prompted through user entry that a fingertip is in place for image capture. Another method of identifying fingerprints is to capture images continuously and to analyze each image to determine the presence of biometric information such as a fingerprint.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface. In other cases, the illumination surface may be parallel to the first surface. Fingerprint identification devices of this nature are generally used to control the building-access or information-access of individuals to buildings, rooms, and devices such as computer terminals.

Before the advent of computers and imaging devices, research was conducted into fingerprint characterization and identification. Today, much of the research focus in biometrics has been directed toward improving the input transducer and the quality of the biometric input data. Fingerprint characterization is thus generally well known and can involve many aspects of fingerprint analysis.

For doorway security systems, biometric authentication systems have many known problems. For example, a user identification code, a PIN, is generally required to identify each individual in order to permit comparison of the biometric information and a single user's template. Remembering a PIN can be inconvenient and the device needed to accept a PIN are sometimes subject to damage and failure. The device is also an additional expense in a doorway access system. Since a single processor can provide processing for several doors, for a multiple doorway system, the PIN entry unit forms a significant portion of the overall system cost. It would be advantageous to provide a system wherein provision of a PIN is not always necessary for identification. To date most biometric authentication systems or services rely on some form of PIN input.

In evaluating security of biometric authorization systems, false acceptance and false rejections are sometimes evaluated as a fraction of a user population. A security system may be characterized as allowing 1 in 1,000 false acceptances or, alternatively, 1 in 1,000,000. Typically a probability distribution curve establishes a cut off for a given registration to determine what false acceptance rate this reflects. Curves of this type are exponential in nature and, therefore, for better false acceptance rates provide only nominal improvements to false acceptance rate for significant changes to a threshold value. Typically when using a biometric information sample, a low match score results in failure to authorize an individual.

In the past, a one-to-many search of biometric information has generally been considered undesirable because security may be compromised. For example, when a single biometric template is compared and a resulting comparison having an approximately 1/1,000,000 likelihood of false acceptance is desired, it should be clear that approximately 1/1,000,000 users may be misidentified. When, however, a forty-user system is provided with equivalent individual comparison criteria, the probability of false acceptance can escalate to $1-(0.999\ 999)^{40}$, which is approximately 1/25,000. Whereas 1/1,000,000 is generally acceptable for many applications, 1/25,000 is likely not as acceptable. Further, as the number of individual templates grows, the rate of false acceptance increases; when 250 templates exist, a likelihood of about 1/4,000 of false acceptance exists.

In order to solve this problem, one might reduce the false acceptance rate to 1/10,000,000; however, this results in problems identifying some people and makes such a system inconvenient. A system of this type is unlikely to provide consistent results and therefore, requires a security guard at least at a door to provide access for those who are not identifiable to 1/10,000,000.

Another potential problem with the use of biometrics is related to the unauthorized interception of a digital signal or file representing a biometric (i.e., similar to unauthorized interception of passcodes/passwords). An unauthorized user may substitute a digital signal of a biometric attribute or template by bypassing biometric readers or scanners altogether. Therefore, like passwords or passcodes, use of biometrics for security purposes and user authorization, verification, and identification of data is not completely full proof.

Based on the foregoing, those skilled in the art can appreciate that despite the advances in biometric authentication, most biometric authentication systems are still plagued with various physical and algorithmic drawbacks. It is believed that the biometric methods and systems disclosed herein overcome such drawbacks by employing a unique random method and system of biometric identification and verification that correlates directly to biometric attributes themselves.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is therefore, one aspect of the present invention, to provide an improved biometric authentication apparatus.

It is also an aspect of the present invention to provide random biometric authentication based on a challenge-response to a user.

It is yet another aspect of the present invention to provide a biometric authentication apparatus based on the random selection of biometric attributes from a user profile containing biometric information about the user.

The above and other features of the invention can be achieved as will now be further summarized. A biometric apparatus for biometrically securing access to an electronic system is disclosed herein. Such an apparatus can be configured in the context of a hardware unit having an input area integrated therein for inputting at least one biometric attribute. The hardware unit can communicate with an electronic system, such as, for example, a building, a computer, a computer network, wireless network, ATM machine, electronic database, etc. A display area can be integrated with the hardware unit, wherein the display area displays data which prompts a user to input to the input area one or more biometric attributes randomly selected from a user profile containing biometric attributes of the user. A biometric module can also be associated with the hardware unit, wherein the biometric module permits the user to perform a user-desired activity, if one or more biometric attributes input by the user via the input area matches at least one biometric attribute randomly selected from the user profile.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The following description is presented to enable a person skilled in the art to make and use the invention, and is provided in the context of particular applications and its requirements. Various modifications to the disclosed embodiments will be readily apparent to those skilled in the art after full appreciation of the following disclosure, and it should be appreciated that the general principles described herein can be applied to other related devices, systems, methods and applications without departing from the spirit and scope of the present invention.

Thus, the present invention is not intended to be limited to the embodiments shown, but is to be accorded the widest scope consistent with principles and features disclosed herein. Although preferred embodiments of the present invention are described herein, those skilled in the art can appreciate that a number of varying embodiments may be implemented in accordance with the present invention.

Figure 1:
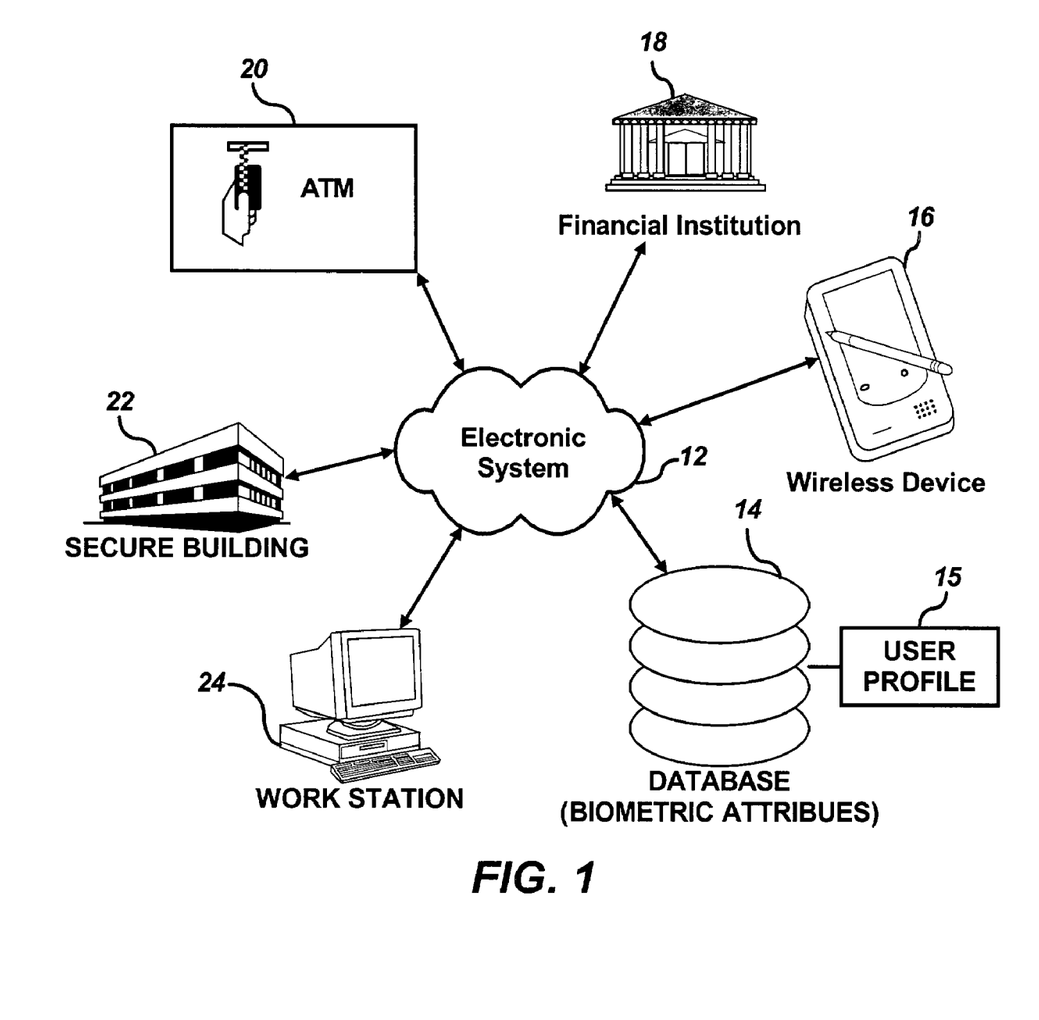
FIG. 1 depicts a block diagram illustrating components of an electronic system associated with a database containing biometric attributes in which preferred embodiments of the present invention can be implemented.

FIG. 1 depicts a block diagram illustrating components of an electronic system 12 associated with a database or memory containing biometric attributes 14, in which preferred embodiments of the present invention may be implemented. Database 14 may be linked or integrated with electronic system 12 and may include a at least one user profile 15 containing biometric templates (i.e., samples) of biometric attributes provided previously by particular users. Electronic system 12 may interact with and communicate with a variety of devices and mechanical systems.

Electronic system 12 can, for example, communicate with a computer workstation 24. In such an example, electronic system 12 may be configured as a remote computer network (e.g., the Internet), or a dedicated computer network (e.g., Intranet, WLAN, LAN, etc.) operating within a particular organization, business or institution. Electronic system 12 can also be configured to communicate with electromechanical systems, such as entry hardware of a secure building 22. A user may access electronic system 12 to secure entry to secure building 22. In some applications, electronic system 12 can be configured as electronics associated with or resident within the user interface (e.g., typical of non-networked systems, such as secure entries).

Additionally, electronic system 12 may be configured to communicate with an Automatic Teller Machine (ATM) 20 and/or point of sale. A user attempting to retrieve cash through ATM 20 can be required to authentication his or her identification, based on previously stored biometric attributes contained within database 14 and/or user profile 15. Database 14 and user profile 15 can function as a biometric broker that communicates as a third-party service with various mechanical systems and other devices through electronic system 12. Electronic system 12 can also enable communication with a financial institution 18 and wireless device 16.

In order to communicate with wireless device 16, electronic system 12 can be configured as part of a wireless network. A wireless device 16 can be, for example, a wireless telephone or a wireless hand held device that can communicate with wireless networks to send and receive data. Wireless device 16 can be, for example, a Wireless Application Protocol (WAP) enabled communications device configured to authenticate the identity of a user through a biometric scanner integrated with or attached to the wireless device.

Figure 2:
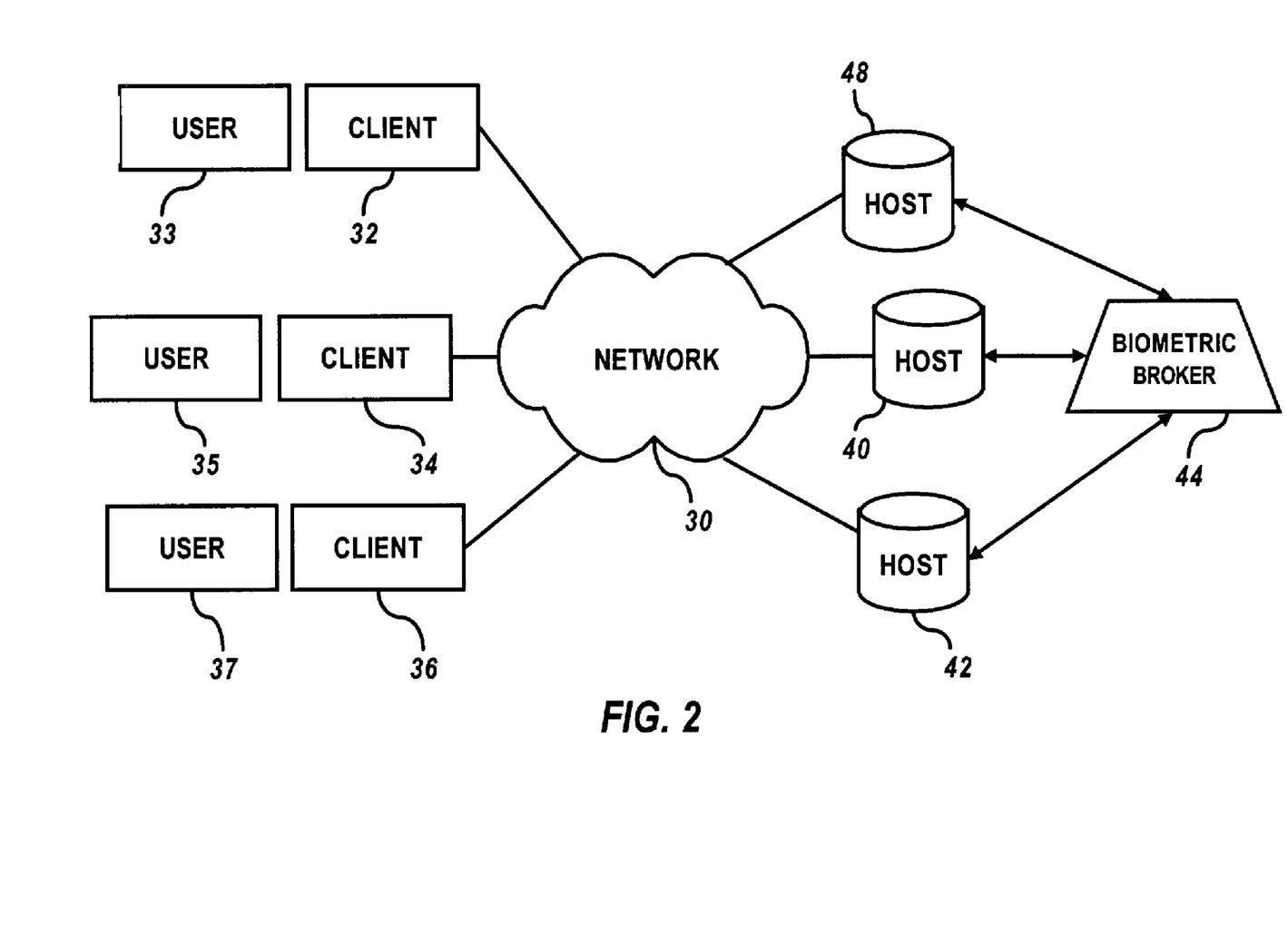
FIG. 2 illustrates a diagram illustrating client computer systems coupled to host systems through a network in which preferred embodiments of the present invention can be implemented.

FIG. 2 illustrates a diagram illustrating client computer systems 32, 34, and 36 coupled to host computer systems 48, 40, and 42 through a network 30, in which preferred embodiments of the present invention can be implemented. Network 30 can be any communication channel through which computer systems can communicate. This includes, but is not limited to, local area networks, such as Ethernet or Token ring, and wide area or remote computer networks, such as the Internet and World Wide Web, well known in the networking arts.

Network 30 can also be implemented as a wireless network through which wireless devices, such as wireless device 16 of FIG. 1, can communicate with other devices and other systems. A client, such as client systems 32, 34, and 36 can be any node on a computer network including computational capability and including a mechanism for communication across network 30. Human users 33, 35, and 37 can operate client systems 32, 34, and 36, respectively. A host, such as host systems 48, 40 and 42, can be any node on a computer network including a mechanism for servicing requests from a client for computational or data storage resources. Hosts can also be implemented as servers.

Figure 4:
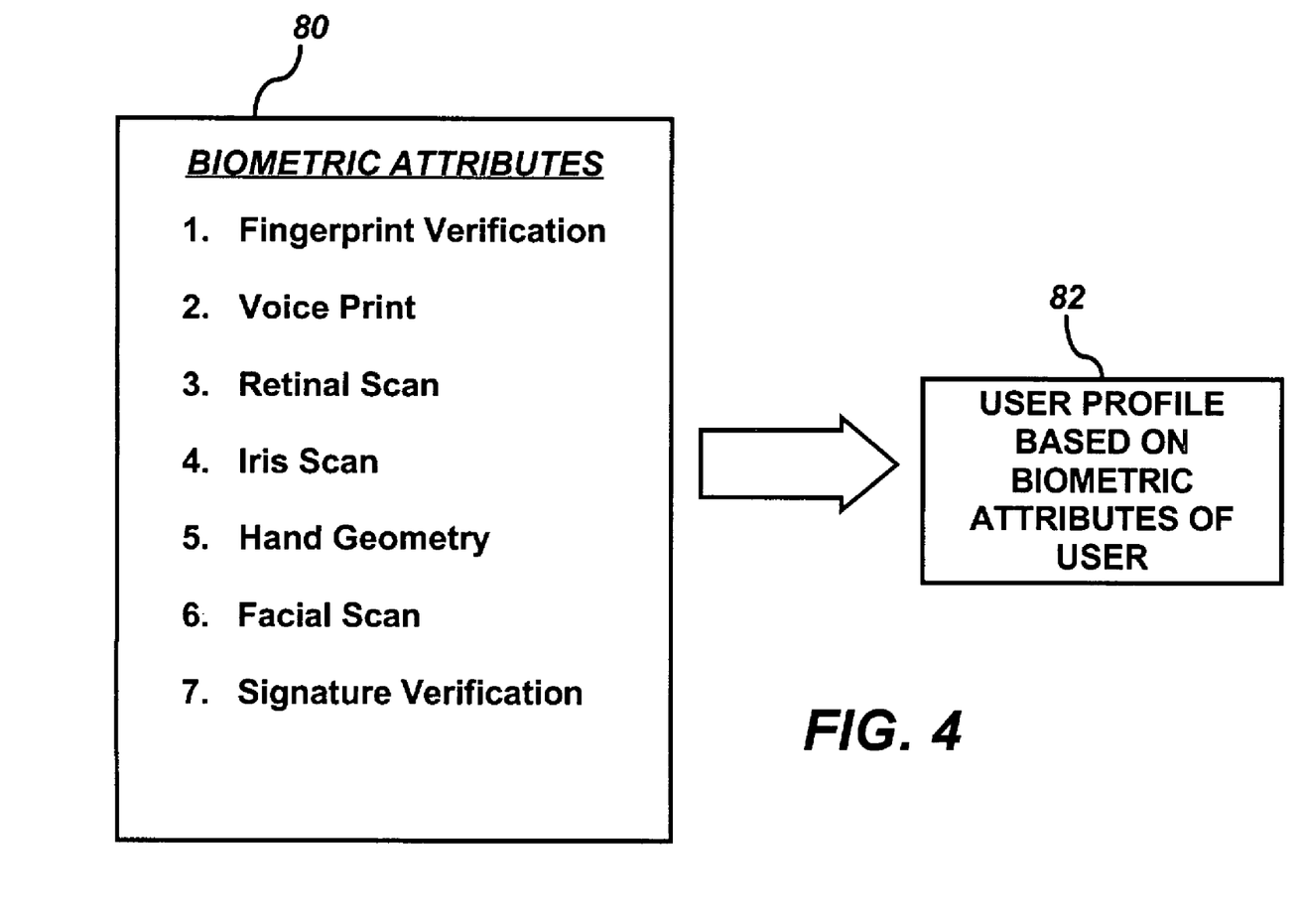
FIG. 4 depicts a diagram illustrating biometric attributes and a user profile, which may be utilized in accordance with preferred embodiments of the present invention.

Host systems 48, 40 and 42 can be coupled to biometric broker 44. Biometric broker 44 can be implemented as a centralized repository for storing biometric attributes (i.e., biometric data), such as fingerprint data. Biometric broker 44 can also be configured as an entity that obtains biometric data form a variety of biometric databases operated by different entities and organizations, and utilizes such information for authentication purposes. FIG. 4, which will be further described herein, lists examples of biometric data that can be utilized in accordance with the present invention. Biometric broker 44 can also include a mechanism for managing the biometric attributes stored as data, and may additionally include a mechanism for implementing security policies for the biometric attributes. Such policies can require specific levels of authentication for different groups of users, or for access to different servers.

Biometric brokers 44 can be implemented in any number of forms. In one possible embodiment, biometric broker 44 can be implemented as a node on network 30, which communicates with host systems 48, 40, and 42 across network 30. In another possible embodiment, biometric broker 44 can be located on a host, such as host system 48.

The example illustrated in FIG. 2 can operate generally as follows. A user, such as user 33, works on a client, such as client system 32. User 33 requests access to resources on host system 48 across network 30. In response to this request, host system 48 attempts to authenticate user 33. In doing so, host system 48 requests a biometric attribute (i.e., biometric data) from biometric broker 44. Biometric broker 44 returns a biometric attribute or biometric template, which can be compared against sample biometric attribute(s) randomly collected from user 33. This comparison may take place at a number of locations, including at client system 32, at host system 48 or at biometric broker 44. If the sample biometric attribute collected from user 33 matches the biometric attribute retrieved from biometric broker 44, user 33 can be permitted to access resources on host system 48.

Providing a centralized authentication service such as biometric broker 114 has a number of advantages. One advantage is generally that centralized revocation can be supported. For example, an employee in an organization typically has access to a number of different resources on a number of different host systems. When this employee leaves the organization, it often takes a long time to explicitly revoke the employee's access rights on all host systems. Under a centralized revocation scheme, such revocation only needs to take place once at the centralized revocation service since the disparate host systems always look to the centralized revocation service to authenticate a user.

Figure 3:
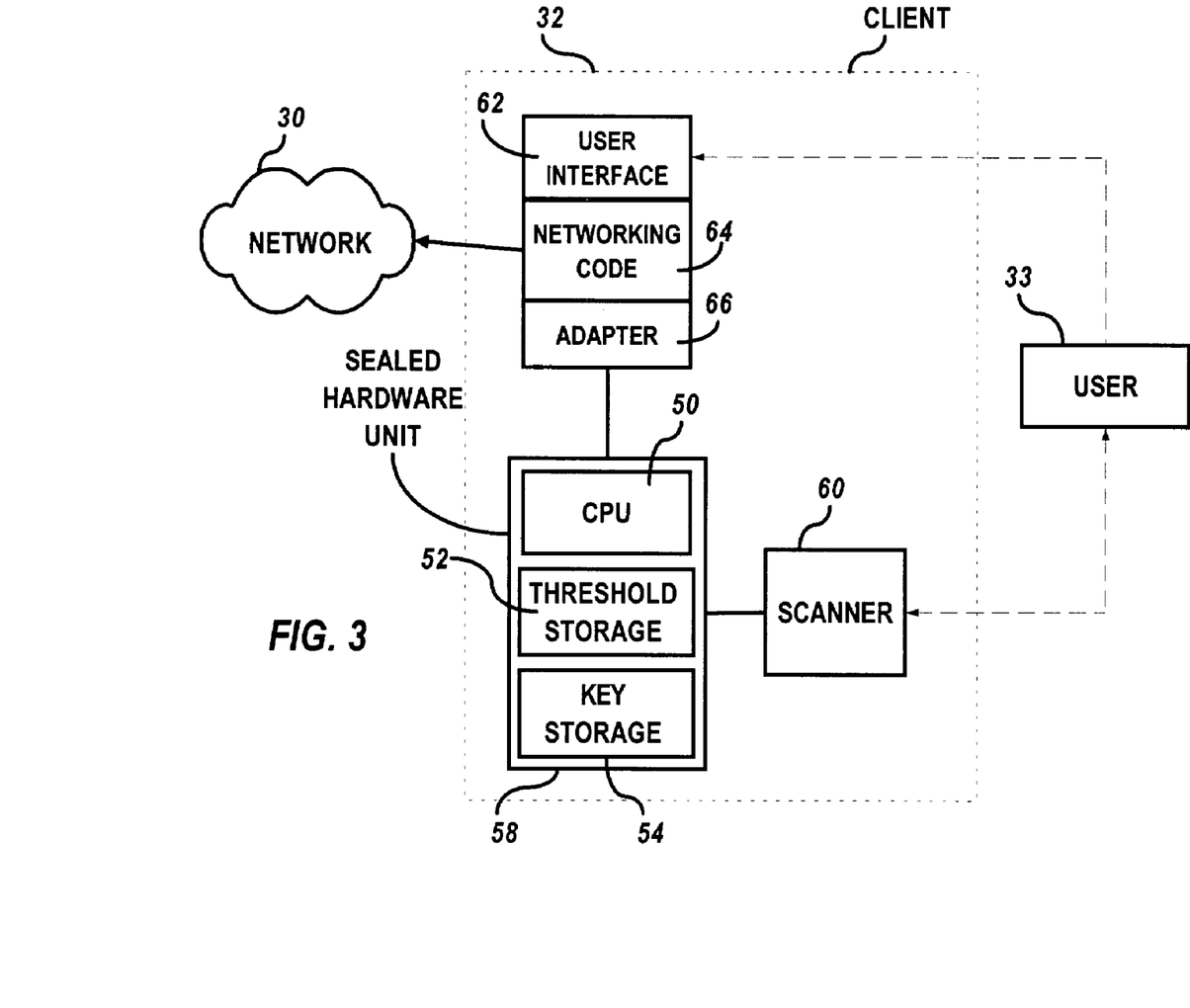
FIG. 3 illustrates a block diagram illustrating some of the functional components within the client computer system depicted in FIG. 2, which can be utilized to implement an embodiment of the present invention.

FIG. 3 illustrates a block diagram illustrating some of the functional components within client computer system 32 that can be utilized to implement an embodiment of the present invention. Note that in FIGS. 2 and 3 identical parts are represented by identical reference numerals. As mentioned above, client system 32 can be any node on a computer network including computational capability and including a mechanism for communication across network 30. In the illustrated embodiment, client system 32 includes user interface 62, networking code 64 and adapter 66. These functional components can be implemented in software running on, for example, a client CPU. User interface 62 provides a mechanism through which user 33 can operate client system 32. Networking code 64 can include a library of functions, which allow client system 32 to communicate across network 30. Adapter 66 can include a collection of functions that implement the client portion of a biometric authentication system according to one embodiment of the present invention.

Adapter 66 can communicate with sealed hardware unit 58, which can be utilized to perform biometric authentication functions. In the example illustrated in FIG. 3, sealed hardware unit 58 can be encased in a sealed insulating layer, which prevents a malicious user of client system 32 from monitoring the computational operations performed within sealed hardware unit 58. This can prevent a malicious user from improperly gaining access to host system 48, even if the malicious user has the power to modify hardware and software resources on client system 32. The circuitry inside sealed hardware unit 58 can be encased in the insulating layer in such a manner that any attempt to cut through the insulating layer to monitor the circuitry is likely to render the circuitry inoperable. Of course, such features are presented herein for illustrative purposes only and should not be interpreted as limiting features of the present invention.

Sealed hardware unit 58 can include a CPU 50, which can be any type of computational engine that can be used to perform the computational and logical operations involved in biometric authentication. Sealed hardware unit 58 can additionally include threshold storage 52 and key storage 54. Threshold storage 52 can be utilized as a memory location for storing threshold values indicating how closely a biometric attribute take as a biometric sample from a user must match a biometric attribute retrieved from a database through biometric broker 44, in order to allow the user to access the host system. Key storage 54 can store at least one encryption key that can be used to encrypt messages or computer checksums for communications across network 30.

Sealed hardware unit 58 can communicate with scanner 60, which can be utilized to take a biometric sample (i.e., biometric attribute) from user 33. This biometric attribute can be any type of biometric measurement of user 33. This includes, but is not limited to, fingerprint data, retinal scan data, handwriting data, voice data (e.g., a voice print), and facial data (e.g., a face scan). Note that the biometric attributes stored as data within a database, such as biometric database 14 and/or user profile 15 of FIG. 1, can be stored as a template or "biometric template".

The components illustrated in FIG. 3 can operate as follows. User 33 initiates the biometric authentication process by seeking access to resources on a host system, such as host system 48 of FIG. 2, through user interface 62. This causes authentication code within adapter 66 to initiate communications with host system 48 (i.e., host system 48 illustrated in FIG. 2). This authentication code within adapter 66 may additionally initiate operations within sealed hardware unit 58 to gather a biometric attribute as a biometric sample from user 33 through scanner 60. These authentication operations are described in more detail below with reference to the flow charts in FIGS. 5 and 6.

FIG. 4 depicts a diagram illustrating biometric attributes and a user profile 82, which can be utilized in accordance with preferred embodiments of the present invention. Elements of user profile 82 in FIG. 4 can be analogous to user profile 15 of FIG. 1. Biometric attributes 80 can include fingerprints, voiceprints, retinal and iris information, hand geometry, facial information, and signatures. Thus, biometric authentication can be based on a variety of possible biometric measurements. A user profile 82 of a particular user will thus include one or more of the aforementioned biometric attributes. Such biometric attributes are utilized to verify the identity of the user.

Typical biometric measurements, which can be utilized to authenticate identity, include fingerprint verification. Fingerprint images contain a large amount of information and therefore has a reliable and inherent accuracy. Fingerprint identification is generally well known in the biometric arts and has been utilized since the 1800's by law enforcement agencies to assist law enforcement officers in criminal investigations.

Hand geometry can also be utilized to measure the physical characteristics of a user's hands and fingers. Hand geometry biometric authentication has traditionally been utilized for physical access control and time/attendance systems. Hand geometry has traditionally been limited to verification (i.e., one-to-one comparisons) rather than identification (one-to-many comparisons. Hand geometry systems do not measure or capture finger or palm prints, but can reliably measure the physical characteristics of an individual's hands from a three dimensional perspective.

Voice recognition is known as another important technique for identify users. In voice recognition systems, a voiceprint is obtained from a user and stored as biometric attributes for later user identification. It is generally well known in the biometric arts that an individual's voice contains unique wavelength sound characteristics. Such characteristics can be analyzed and stored as biometric data.

Retinal scanning is another biometric measurement technique that can be utilized in accordance with the present invention. Retinal scanning is generally based on a biometric measurement process that maps the structure of veins at the back of individual's eye. Retinal scanners typically send a beam of concentrated light into the eye. Retinal scanners, however, employ low intensity light for measuring the retina characteristics associated with an individual.

Iris scanning is another biometric measurement technique that can be utilized in accordance with the methods and systems disclosed herein. Iris scanning, well known in the biometric arts, scans unique random patterns of an individual's iris. Such a measurement method does not rely on the iris color. Iris scanning is generally based on the fact that the color portion of the eye that surrounds the pupil contains patterns that are unique to each individual.

An individual's signature is another important biometric attribute that can be utilized to verify the identity of an individual. Signature verification can be readily utilized with the other biometric measuring techniques utilized above.

Facial recognition may be utilized in accordance with the present invention to enhance biometric authentication. In facial recognition techniques, a facial scan of an individual is taken and stored as data which may later be compared against a user's most recently provided facial scan to confirm or deny user identity. In typical facial scan systems, a user steps in front of a digital camera, which captures an image of the user's face. Associated software captures the image and creates a facial template.

Some facial recognition software currently in use relies on Local Feature Analysis (LFA) to measure the size and shape of features around the eyes or center of the face captured in the image, along with the width of the bridge of the nose or distance form the nose to each eye. Such software relies on features that are not statistically change altered to weight gain or loss, aging, facial hair growth and so forth.

An example of a facial recognition system that uses facial recognition software is Visionics' Faceit software, which works with simple digital Web cameras to verify a user's identity for access to computers and associated computer networks. Other biometric attributes are not shown in FIG. 4, but those skilled in the art can apply equally to the practice of the present invention. Such biometric attributes may include a palm print, ear shape, ear canal acoustic properties, DNA, keystroke (e.g., typing rhythm), and body odor.

Figure 5:
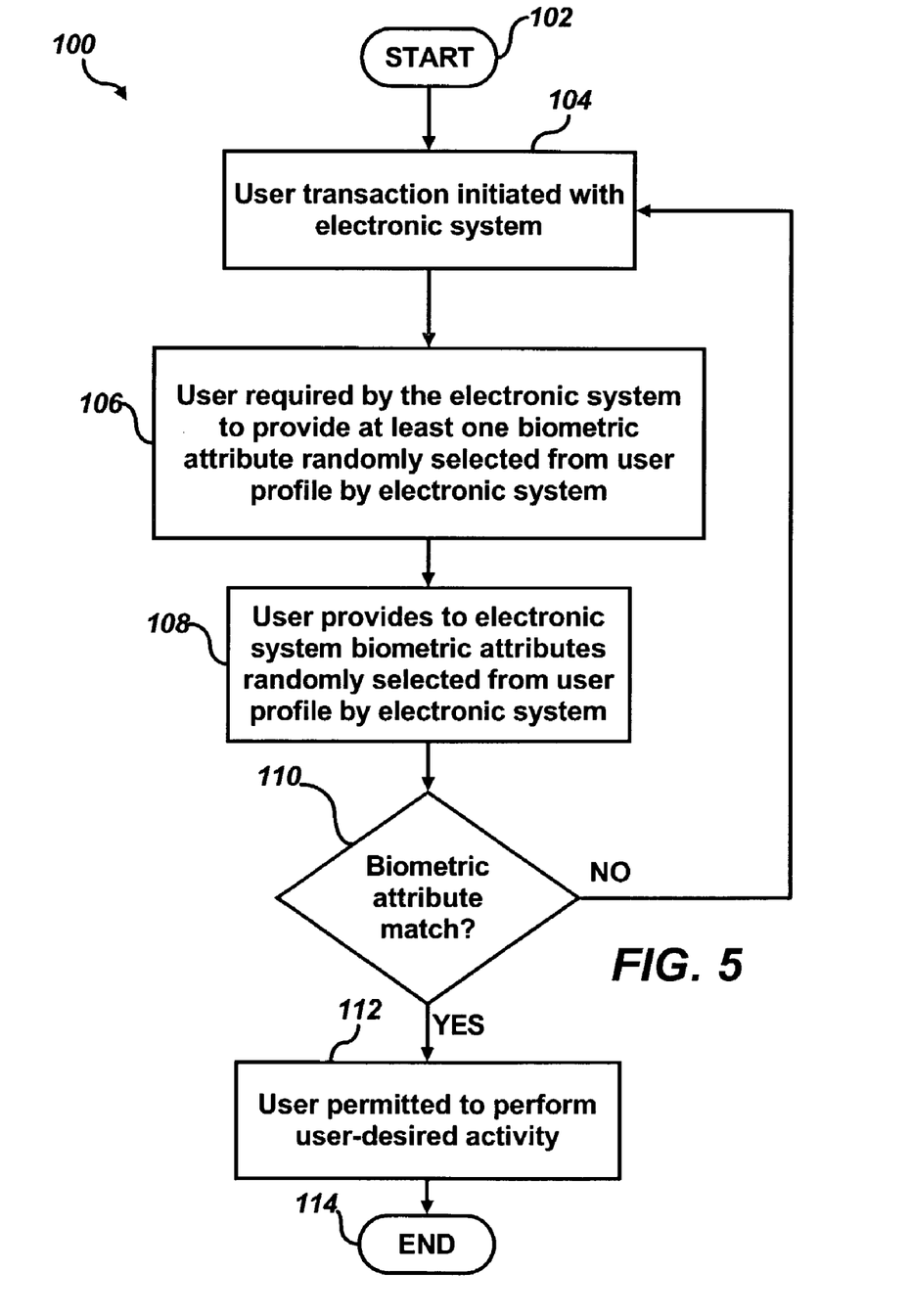
FIG. 5 illustrates a flow chart illustrating operations for authenticating a user in accordance with an embodiment of the present invention.

FIG. 5 illustrates a flow chart 100 illustrating operations for authenticating a user, in accordance with an embodiment of the present invention. The process can be initiated as indicated at block 102. A user transaction may be initiated with an electronic system, as depicted thereafter at block 104. Such an electronic system can, for example, be configured as an ATM and/or point of sale linked to a computer network that communicates with a biometric broker, such as biometric broker 44 of FIG. 2.

As explained previously, such a biometric broker can be composed of a database containing biometric attributes and/or a user profile integrated with or in communication with the database. The user profile contains previously store biometric attributes of a particular user. A user during enrollment can provide biometric attributes. During such an enrollment stage, samples of designated biometric attributes may be acquired. One or more unique features of the samples can then be configured to form a biometric template of one or more biometric attributes for subsequent comparison purposes.

As depicted next at block 106, the user is requested by the electronic system to provide at least one biometric attribute. The operation described at block 106 is based on random factors. In the operation depicted at block 106, the user is prompted to input to the electronic system at least one biometric attribute randomly selected from a user profile containing biometric attributes of the user. User input of a biometric attribute can be based on this random selection. Thereafter, as illustrated at block 108, the user provides to the electronic system, the biometric attributes randomly selected by the electronic system from the user profile.

As described next at block 110, a comparison may be made between the random biometric attribute(s) selected by the electronic system from the user profile and the biometric attributes input by the user to a biometric scanner. If a match does not occur, then the process can be repeated, for example, beginning with the operation depicted at block 104. Alternatively, the process can begin, as indicated at block 106 where the user session has not been terminated.

If a match does occur, then as depicted at block 112, the user may be permitted to perform a user-desired activity such as, for example, performing financial transactions. If a biometric attribute input by the user to the electronic system does not match one or more of the biometric attributes randomly selected from the user profile associated with the user after, for example, three attempts, the user is not permitted to perform user-desired activities or transactions.

Figure 6:
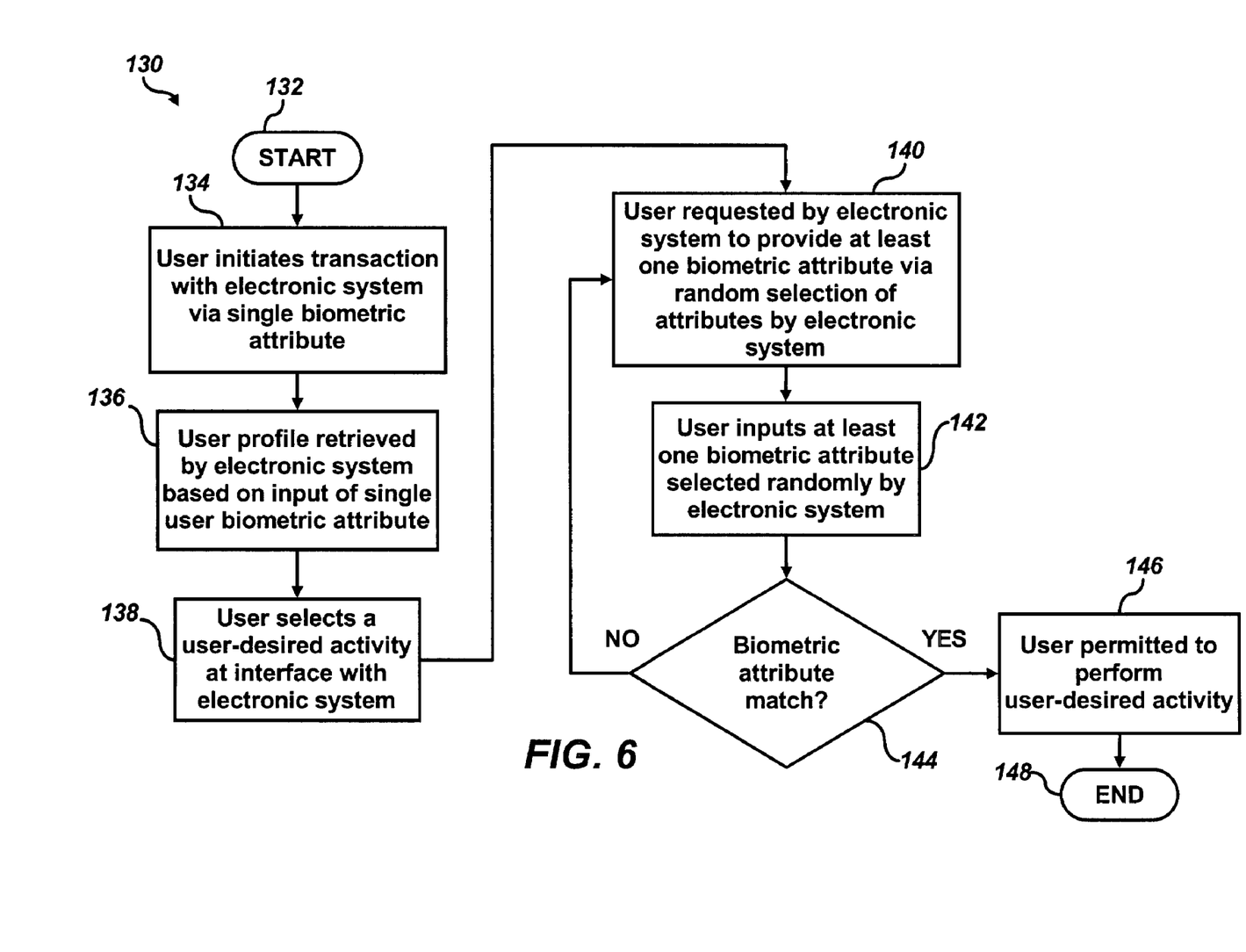
FIG. 6 depicts a flow chart illustrating additional operations for authenticating a user in accordance with an embodiment of the present invention.

FIG. 6 depicts a flow chart 130 illustrating additional operations for authenticating a user, in accordance with another embodiment of the present invention. The process can be initiated, as indicated at block 132. Thereafter, as illustrated at block 134, a user can initiate a transaction with an electronic system via submission of a single biometric attribute. This single biometric attribute may be provided via, for example, a fingerprint provided by the user through a fingerprint scanner integrated with the electronic system.

This single biometric attribute may also be provided via a smart card that is receivable by, or in association with, the biometric system. Biometric attributes can be previously stored within a memory location contained within the smart card for later retrieved (e.g., read or scanned by an electronic system at a point of sale or ATM) for user authentication or verification purposes using biometric methods taught herein. Smart cards are generally known in the art to appear as credit card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards may be generally configured as either a contact or contactless smart card, or a combination thereof. A contact smart card requires insertion into a smart card reader with a direct connection to, for example, a conductive micromodule on the surface of the card. Such a micromodule may be generally gold plated. Transmission of commands, data, and card status takes place through such physical contact points.

A contactless card requires only close proximity to a reader. Both the reader and the card may be implemented with antenna means providing a contactless link that permits the devices to communicate with one another. Contactless cards can also maintain internal chip power or an electromagnetic signal (e.g., RF tagging technology). Two additional categories of smart codes, well known in the art, which are based on contact and contactless cards are the so-called Combi cards and Hybrid cards.

A Hybrid card generally may be equipped with two chips, each with a respective contact and contactless interface. The two chips are not connected, but for many applications, this Hybrid serves the needs of consumers and card issuers. The Combi card may be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized when low to medium security requirements. A microprocessor chip can add, delete and otherwise manipulate information in its memory. Microprocessor-based memory cards typically contain microprocessor chips with 8, 16, and 32 bit architectures.

When a transaction is initiated with a biometric attribute, the user can input a single biometric attribute at the request of, or to initiate, the electronic system. The electronic system can be, for example, an ATM machine equipped with a biometric scanner. The biometric scanner can be configured with, for example, iris scanning, retinal scanning, and fingerprint scanning capabilities. The user can, for example, provide his or her left thumbprint, if requested by the electronic system, to initiate a transaction utilizing the electronic system. Following user input of a single biometric attribute, a user profile can be retrieved by the electronic system based on the input of a single user biometric attribute, such as a fingerprint. Again, retrieval can be from a server, electronic system memory, or portable device memory (e.g., smart card or other electronic hand held device)

The user selects a desired user-activity at an interface associated with the electronic system, as indicated at block 138, and thereafter, as illustrated at block 140, the user can be requested by the electronic system to provide at least one biometric attribute via random selection of such an attribute by the electronic system from the user's template/profile. Biometric attributes are thus randomly selected from the user profile associated with the user. The user must then provide the electronic system with biometric attributes that match the biometric attributes randomly selected from the user profile, as indicated at block 142.

If a biometric attribute input by the user through an interface and biometric scanner associated with the electronic system does not match the biometric attributes randomly selected from the user profile, the user can be requested again, as indicated at block 140. If, however, a match is made, then the user may be permitted to perform the user-desired activity, such as accessing secure data or entry to a secure building, as illustrated at block 146. The process then terminates, as indicate at block 148.

Figure 7:
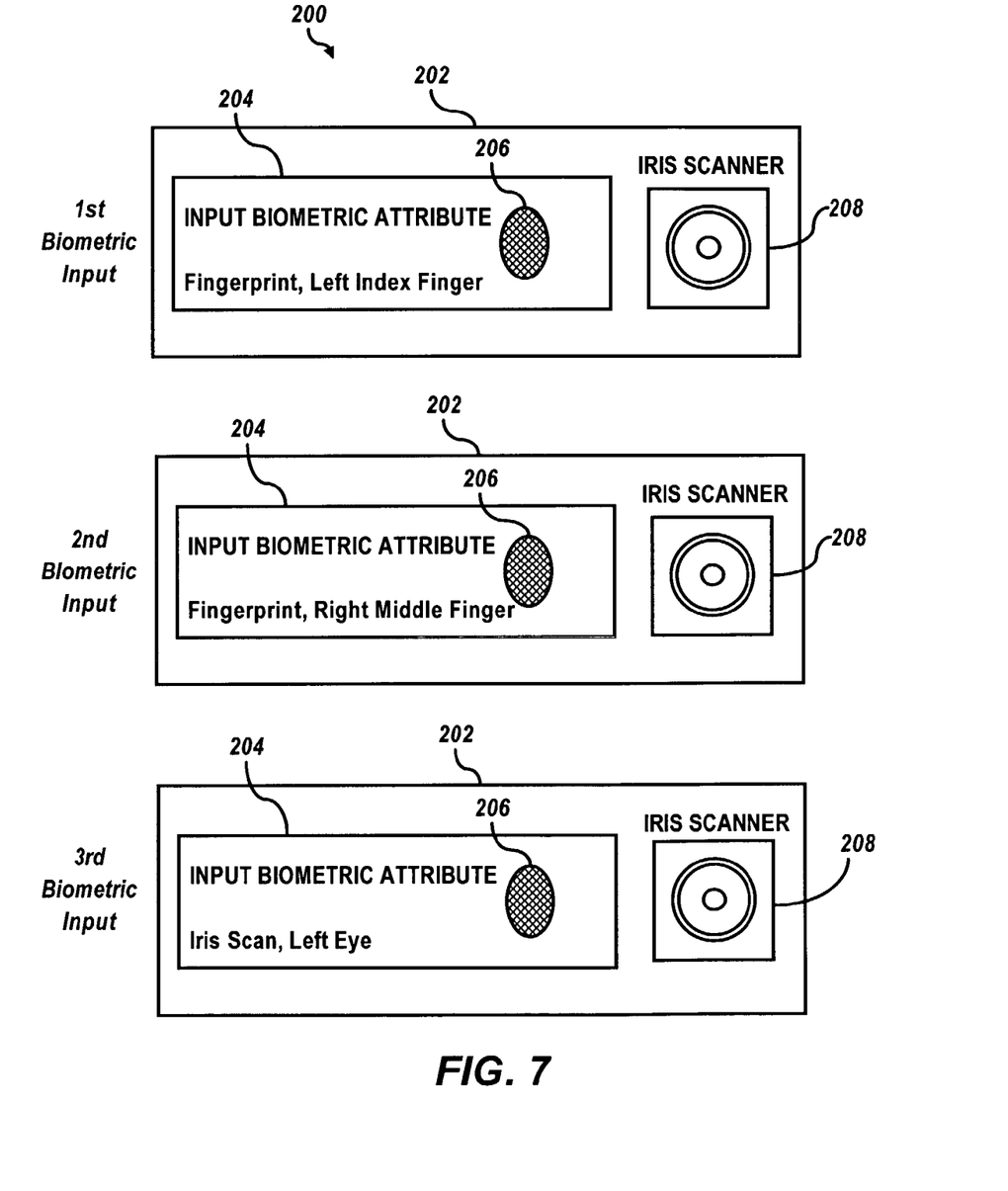
FIG. 7 depicts a portion of a user interface that can be implemented in accordance with the present invention.

FIG. 7 depicts a pictorial diagram 200 of a user interface 202 that can be implemented in accordance with the present invention. In the drawing illustrated in FIG. 7, user interface 202 is shown, for example, at three different moments in time. User interface 202 can be analogous to user interface 64 of FIG. 3. Those skilled in the art can appreciate that a user interface 202 can be of many forms depending on the type of biometric sample being requested, obtained and/or utilized. It can be appreciated by those skilled in the art that user interface 202 can be implemented in the context of a hardware unit which communicates with one or more electronic systems (e.g., a building security systems, PDA, laptop computer, computer network, wireless communications network, etc.).

As indicated previously, a user can be requested by an electronic system to provide one or more biometric samples for authentication purposes. Biometric samples can be of different types described herein (e.g., voice, fingerprint, eye, etc.). The user can be prompted to input biometric samples randomly selected by the electronic system from a user profile containing biometric attributes previously obtained from the user. User interface 202 may be integrated with, for example, an ATM machine, or a secure door that accesses a secure area, such as a government building or military complex. In the example depicted in FIG. 7, user interface 202 includes an iris scanner 208 and a fingerprint scanner 206. Finger print scanner 206 can be integrated with a display area 204, which can also be integrated with iris scanner 208.

Input of a biometric attribute by a user to interface 202 can be based on the random selection of a biometric attribute from a user profile. The number of biometric attributes requested from a user can also be based on a random number. For example, during one authentication session, a user can be requested to provide a left index fingerprint and a left iris scan. During another authentication session, the same user may be required to provide a left index fingerprint, followed by the fingerprint of his or her right middle finger, and immediately thereafter, an iris scan of a left eye, or perhaps, a right eye.

The selection of biometric attributes from the user profile may thus be based on a random selection. The number of required biometric samples that a user may be required to input may also be a random number. Those skilled in the art will appreciate, however, that the number of biometric attributes required to be input by a user will likely be a limited number. Thus, a user can be required to input only three biometric attributes during one authentication session, two biometric attributes during another authentication session, and five biometric attributes during another biometric session.

Those skilled in the art can also appreciate that other biometric scanning devices can also be integrated with the user interface 202, such as, for example, a retina scanner, palm scanner, voice print scanner, and so forth. Thus, the example illustrated in FIG. 7 should not be interpreted as limiting the invention. The drawing illustrated in FIG. 7 merely represents one possible embodiment in which the present invention may be implemented.

Figure 8:
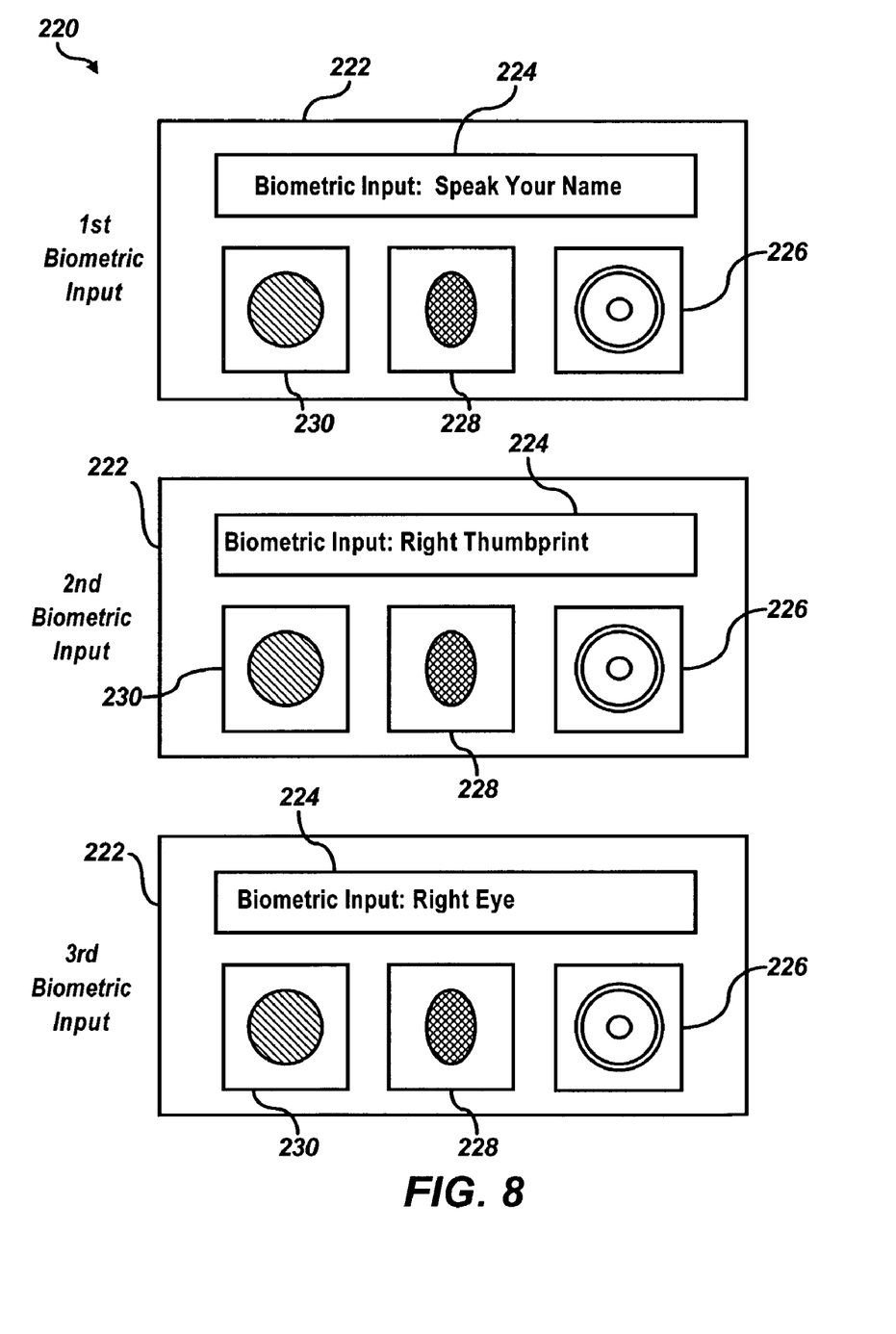
FIG. 8 depicts a portion of an alternative user interface that can be implemented in accordance with the present invention.

FIG. 8 depicts a pictorial diagram 220 illustrating a portion of an alternative user interface 222 that can be implemented in accordance with the present invention. User interface 222 can communicate with or be integrated with an electronic system, such as an ATM machine or point of sale. User interface 222 can be integrated with a microphone 230 that may receive a voiceprint from a user. User interface 222 can also be integrated with a fingerprint scanner 228 that captures fingerprints as biometric data from users. Additionally, user interface 222 can include a camera 226 that functions for iris, retinal, and facial scanning purposes.

Note that pictorial diagram 220 illustrates first, second and third biometric attribute input stages. During a first biometric attribute input stage, a user may be prompted through a display unit 231 to input his or her name or other word or phrase (or other information). The user merely speaks his or her name, for example, into microphone 230. During a second biometric attribute input stage, the user may be requested to input his or right hand thumbprint. Finally, during a third biometric attribute input stage, the user may be requested to provide a biometric sample of his or right eye, which may be scanned as a retina or iris biometric attribute of the user. Alternatively, the user may be asked to provide a facial scan, in which case, camera 226 captures a facial image of the user for biometric authentication purposes.

Those skilled in the art will appreciate that the methods described herein can be implemented in the context of associated systems for performing tasks resulting from the processing of such methods. The present invention can thus be configured as a system for biometrically securing access to an electronic system. Such a system can include modules thereof. A module, in software use, is generally a collection of routines and data structures that performs a particular task or implements a particular abstract data type. Module typically are composed of an interface, which lists the constants, data types variables, and routines that can be accessed by other modules or routines, and an implementation, which can be accessible only by the module. The implementation contains the source code that actually implements the routines in the module.

Thus, the system described herein can include a module for prompting a user to input to the electronic system at least one biometric attribute randomly selected from a user profile containing biometric attributes of the user. Additionally, the system can include a module for permitting the user to perform a user-desired activity if at least one biometric attribute input by the user to the electronic system matches the at least one biometric attribute randomly selected from the user profile.

In such a system, the user profile is generally accessible from a server and/or memory through the electronic system. The user profile can also be accessible from a biometric broker through the electronic system over a secure network connection. Additionally, at least one biometric is attribute can be obtained from the user for compilation in a user profile. The user profile is generally stored in a location accessible by at least one electronic system. The user is generally permitted to modify the user profile, in response to approval of a request by the user.

Such a system can also include a module for comparing at least one biometric attribute input by the user to the electronic system with the at least one biometric attribute randomly selected from the user profile. Additionally, such a system includes a module for subsequently prompting a user to input to the electronic system at least one additional biometric attribute randomly selected from the user profile, if at least one biometric attribute previously input by the user to the electronic system does not match the at least one biometric attribute randomly previously selected from the user profile.

In such a system, the electronic system can be configured as one or more wireless devices that operate with a wireless network. The electronic system can also be configured as one or more computer workstations operable over an associated network. The electronic system can be an automated teller machine, or a secured entry system to a secured environment. The electronic system can simply be a wireless network or a computer network, or a combination thereof. The electronic system can also be a wireless device.

Such a system may also include a module for identifying at least one defective biometric attribute associated with the user. The user can be prompted to input to the electronic system at least one additional biometric attribute randomly selected from a user profile containing biometric attributes of the user. The user-desired activity may comprise activities, such as, for example, a financial transaction, an ATM transaction, access to a secure area, or access to data from the electronic system. The user-desired activity may also simply comprise the execution of a mechanical activity.

Alternatively, a system for biometrically securing access to an electronic system can include a module for prompting a user to input to the electronic system at least two biometric attributes randomly selected from a user profile containing biometric attributes of the user. Such an alternative system can also include a module for permitting the user to perform a user-desired activity, if biometric attributes input by the user to the electronic system matches the at least two biometric attribute randomly selected from the user profile.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. For example, a variety of biometric attributes may be utilized in a variety of combinations and configurations to implement particular embodiments of the present invention.

Many modifications and variations are possible in light of the above teaching without departing from the spirit and scope of the following claims. It is contemplated that the use of varying embodiments of the present invention can involve components having different characteristics. It is intended that the scope of the present invention be defined by the claims appended hereto, giving full cognizance to equivalents in all respects.

The invention claimed is:

1. A method for the authentication of a user at a point of entry in coordination with biometric data provided from a remote server after preliminary identification of the user based on identification information wirelessly provided from a portable electronic device carried with the user when the user is located near a point of entry, the method comprising:
   associating an electronic system with a point of entry, the electronic system including a biometric interface, access to a data network and wireless communications hardware wirelessly communicating with a portable electronic device carried by a user approaching the point of entry, the user seeking access through the point of entry;
   wirelessly accessing, via the electronic system, identification information associated with the user from the portable electronic device carried with the user;
   utilizing the identification information provided from the portable electronic device to obtain a user profile from a remote server via the data network, the user profile including user identification information and a biometric template associated with the user,
   providing the identification information and the biometric template from the remote server to the point of entry in advance of an arrival of the user at the point of entry for passage through the point of entry;
   comparing at least one of the identification information and the biometric template with credentials carried with the user and at least one physical attribute of the user captured by the biometric interface; and
   authenticating the user via the electronic system and granting the user access through the point of entry, if the at least one of the identification information and the biometric template match at least one of the credentials carried with the user and the at least one physical attribute of the user captured by the biometric interface.

2. The method of claim 1 wherein the portable electronic device carried by the user comprises an RFID tag.

3. The method of claim 1 wherein the portable electronic device carried by the user comprises a wireless electronic communications device.

4. The method of claim 3 wherein the wireless electronic communications device communicates with the electronic system via a Bluetooth communications link.

5. The method of claim 3 wherein the wireless electronic communications device communicates with the electronic system via a cellular communications link.

6. The method of claim 1 wherein the biometric interface comprises a camera that captures the at least one physical attribute of the user.

7. The method of claim 6 wherein the at least one physical attribute comprises an image of a face of the user captured by the camera.

8. The method of claim 1 wherein the credentials carried by the user comprise an identification medium bearing a name and a photograph of the user.

9. The method of claim 1 wherein the biometric interface comprises a biometric reader that captures from the user, at least one of fingerprint data, retinal scan data, handwriting data, voice data and facial data.

10. A method for the authentication of a user at a point of entry in coordination with biometric data provided from a remote server after preliminary identification of the user based on identification information provided wirelessly from an RFID tag carried with the user when the user is located near a point of entry, the method comprising:

associating an electronic system with a point of entry, the electronic system including a biometric interface, access to a data network and wireless communications hardware;

wirelessly communicating via the wireless communications hardware with an RFID tag carried by a user approaching the point of entry, the user seeking access through the point of entry;

wirelessly accessing, via the electronic system, identification information associated with the user from the RFID tag carried with the user;

utilizing the identification information provided from the RFID tag to obtain a user profile from a remote server via the data network, the user profile including user identification information and a biometric template associated with the user, providing the identification information and the biometric template from the remote server to the point of entry in advance of an arrival of the user at the point of entry for passage through the point of entry;

comparing at least one of the identification information and the biometric template with credentials carried with the user and at least one physical attribute of the user captured by the biometric interface; and authenticating the user via the electronic system and granting the user access through the point of entry, if the at least one of the identification information and the biometric template match at least one of the credentials carried with the user and the at least one physical attribute of the user captured by the biometric interface.

11. The method of claim 10 wherein the biometric interface comprises a camera that captures the at least one physical attribute of the user.

12. The method of claim 11 wherein the at least one physical attribute comprises an image of a face of the user captured by the camera.

13. The method of claim 11 wherein the credentials carried by the user comprise an identification medium bearing a name and a photograph of the user.

14. The method of claim 11 wherein the biometric interface comprises a biometric reader that captures from the user, at least one of fingerprint data, retinal scan data, handwriting data, voice data and facial data.

15. A system for the authentication of a user at a point of entry in coordination with biometric data provided from a remote server after preliminary identification of the user based on identification information wirelessly provided from a portable electronic device carried with the user when the user is located near a point of entry, the system comprising:

a point of entry;

an electronic system associated with the point of entry, the electronic system including a biometric interface, access to a data network and wireless communications hardware wirelessly communicating with a portable electronic device carried by a user approaching the point of entry, the user seeking access through the point of entry, wherein the electronic system wirelessly accesses identification information associated with the user from the portable electronic device carried with the user;

a remote server that stores a user profile, wherein the identification information provided by the electronic device is utilized to obtain the user profile from the remote server via the data network, the user profile including user identification information and a biometric template associated with the user, wherein the identification information and the biometric template are provided from the remote server by the electronic system to the point of entry in advance of an arrival of the user at the point of entry for passage through the point of entry;

wherein at least one of the identification information and the biometric template are compared by the electronic system with credentials carried with the user and at least one physical attribute of the user captured by the biometric interface; and wherein the user is authenticated via the electronic system and granted access through the point of entry, if the at least one of the identification information and the biometric template match at least one of the credentials carried with the user and the at least one physical attribute of the user captured by the biometric interface.

16. The system of claim 15 wherein the portable electronic device carried by the user comprises an RFID tag.

17. The system of claim 15 wherein portable electronic device carried by the user comprises a wireless electronic communications device.

18. The system of claim 17 wherein the wireless electronic communications device communicates with the electronic system via a Bluetooth communications link.

19. The system of claim 17 wherein the wireless electronic communications device communicates with the electronic system via a cellular communications link.

20. The system of claim 15 wherein the biometric interface comprises a camera that captures the at least one physical attribute of the user.

21. The system of claim 20 wherein the at least one physical attribute comprises an image of a face of the user captured by the camera.

* * * * *